Dec. 21, 1926.   1,611,437
F. D. HARDESTY
SMOKER'S APPLIANCE
Filed June 19, 1923    2 Sheets-Sheet 1
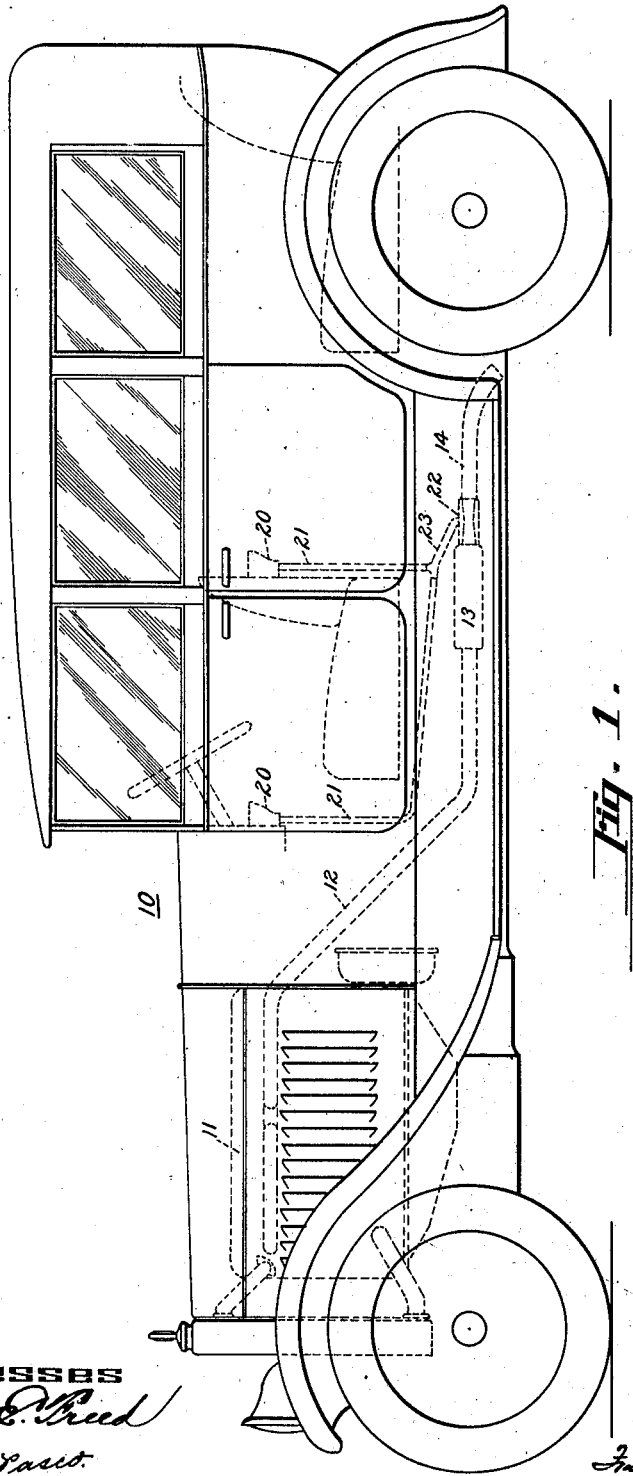

Dec. 21, 1926.                                                1,611,437
F. D. HARDESTY
SMOKER'S APPLIANCE
Filed June 19, 1923          2 Sheets-Sheet 2
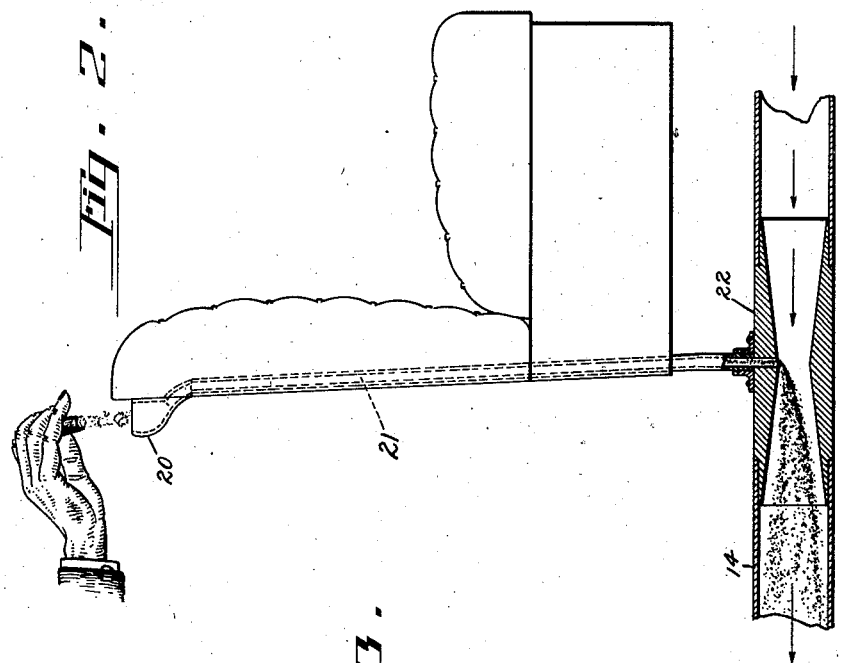
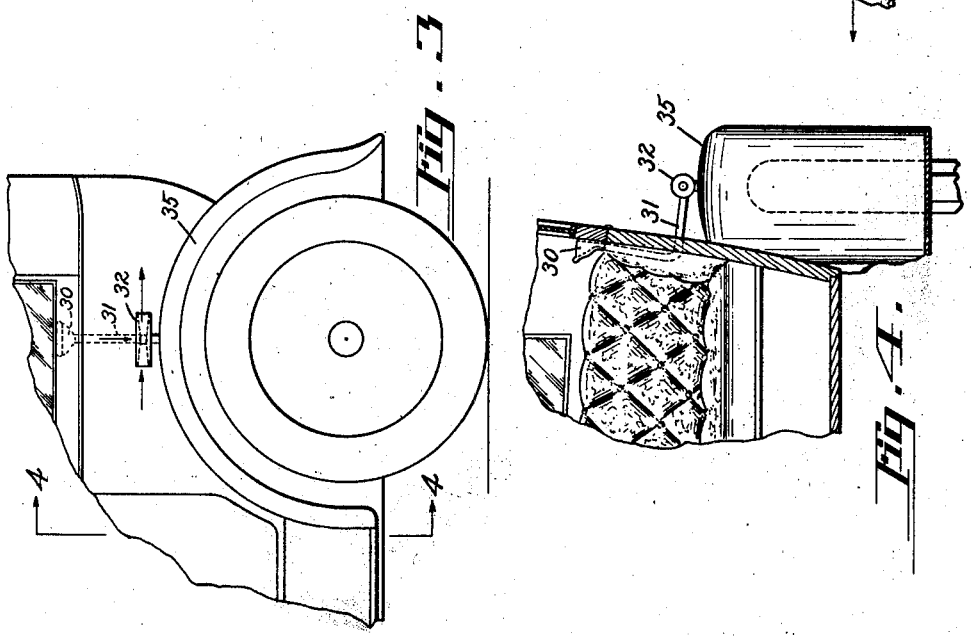
Witnesses                                    Inventor.

Patented Dec. 21, 1926.

1,611,437

UNITED STATES PATENT OFFICE.

FRANCIS D. HARDESTY, OF DAYTON, OHIO.

SMOKER'S APPLIANCE.

Application filed June 19, 1923. Serial No. 646,435.

The present invention relates to smokers' appliances and more specifically to such an appliance in the form of automobile accessories. The particular accessory is an ash receptacle which is more especially adapted for use with closed cars.

Among the objects of the invention is the disposal of ash of cigarettes, cigars, etc., from such cars, saving their being dropped on the floor of the machine rendering it uncleanly.

Further objects and advantages of the present invention will be apparent from the following description, reference being had to the accompanying drawings, wherein preferred forms of embodiments of the present invention are clearly shown.

In the drawings:

Fig. 1 illustrates an elevation of an automobile showing in dotted lines the present invention applied thereto.

Fig. 2 is a detail with parts enlarged and in section showing an embodiment of the invention.

Fig. 3 is an external view of part of an automobile showing a modified form of the invention.

Fig. 4 is a section on line 4—4 of Fig. 3.

In the drawings, in Fig. 1, is shown an automobile, represented as a whole by the numeral 10, provided with the usual engine indicated at 11, which engine is in turn provided with an exhaust pipe 12 and muffler 13. The muffler is as usual located under the floor of the automobile body and is provided with a short exit pipe 14.

Inside of the body and placed at a convenient location is a cup or ash receiver 20. This cup is provided with sloping internal walls leading to a pipe 21 which in turn leads through the floor of the machine to a Venturi tube 22 which is inserted in exit pipe 14 and is arranged to exert suction through tube 21 when the engine 11 is in operation. If desired a second cup 20' may be placed within the car in order to serve other occupants of the vehicle. This cup 20' is also provided with a connection tube 21' and pipes 21 and 21' may lead to a common header 23 which may be attached in operative relation to Venturi tube 22.

In the modification shown in Figs. 3 and 4 a cup 30 of the same character as cup 20 may be placed within the body and a tube 31 may extend therefrom to a venturi 32 which may be placed outside of the body in the air stream occasioned by forward movement of the vehicle. In Figs. 3 and 4 the venturi 32 is indicated as mounted upon the rear fender 35 of the vehicle.

It is of course obvious that other locations for the cups and for the Venturi tubes may be found which will be advantageous under other circumstances.

While the forms of embodiments of the present invention as herein disclosed, constitute preferred forms, it is to be understood that other forms might be adopted, all coming within the scope of the claims which follow.

What I claim is as follows:

1. In combination with an automobile having a motor provided with an exhaust pipe, a cup or tray located within the body of the automobile and provided with a tube extending therefrom to a Venturi tube associated with the engine exhaust in such fashion as to exert suction in said cup.

2. In combination with an automobile, a cup or tray located within the body thereof in a location convenient to the occupant or occupants of said automobile and connected by means of a tube with a Venturi tube so placed as to produce suction within said cup during operation of the vehicle.

In testimony whereof I hereto affix my signature.

FRANCIS D. HARDESTY.